Patented Oct. 24, 1950

2,526,934

UNITED STATES PATENT OFFICE 2,526,934

REMOVAL OF EXOTHERMIC HEAT OF REACTION

Alfred Clark, Bartlesville, Okla., assignor to Phillips Petroleum Company, a corporation of Delaware No Drawing. Application January 20, 1947, Serial No. 723,195

3 Claims. (Cl. 260—449.6)

The present invention relates to the synthesis of hydrocarbons from synthesis gas mixtures comprising carbon monoxide and hydrogen. In a more particular aspect, it relates to a method for carrying out the process known as the Fischer-Tropsch reaction while controlling the temperature in a novel manner.

In carrying out the Fischer-Tropsch reaction on a large scale, efforts have been hampered considerably by difficulties in dissipating the large amount of heat evolved in this reaction. The minimum amount of heat which must be dissipated is approximately 48,000 calories in accordance with gram-molar quantities in the following equation:

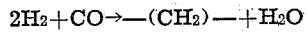

$$2H_2 + CO \rightarrow -(CH_2)- + H_2O$$

Additional, but smaller amounts of heat are evolved in the polymerization of $-(CH_2)-$ or methylene radicals into higher and more stable olefinic compounds.

Previous commercial practice has been to dissipate this exothermic heat of reaction by confining the catalyst in tubes of small diameter, usually less than one inch, and surrounding these tubes with some liquid which may absorb the heat of reaction at constant temperature as latent heat of vaporization. This type of operation has, of course, led to reactors of complicated design which have added greatly to the cost of production of liquid hydrocarbons by this process.

The use of liquid coolants in direct contact with the catalyst and reacting gases as a means of removing the heat of reaction has been mentioned previously in the patent literature. Practically all of the heat is removed in such cases as latent heat of evaporation of the liquid cooling agent. The liquid cooling agent may be what is termed a "proper oil," that is, a recycled portion of the products of reaction, or it may be some extraneous liquid.

It is an object of the present invention to provide a process for carrying out the synthesis of hydrocarbons from carbon monoxide and hydrogen while maintaining the temperature of reaction within close limits. It is a further object of the present invention to utilize liquid coolants for absorbing heat of reaction in the Fischer-Tropsch process, in a novel manner. Other objects will be apparent from the disclosure below.

I have found that the successful maintenance of the reaction temperature within closely controlled limits by the use of liquid coolants is dependent on the nature of the liquid coolant, particularly its boiling point, and the reaction pressure and temperature. It has been shown that the closest temperature control in this type of operation is obtained when for a given liquid coolant and reaction temperature, the pressure of the reaction is adjusted so that the liquid coolant is substantially at its boiling point.

In other words, the present invention resides in the coordination of boiling point of coolant with reaction temperature and pressure so that the coolant is introduced at substantially its boiling point, under such conditions, that a substantial proportion thereof, at least, is in the liquid phase. In this way the maximum cooling effect is realized by absorption of the required amount of heat as latent heat of vaporization of the liquid. This permits ready control of temperature at the predetermined boiling point.

The liquid coolant and synthesis gas mixture composed of hydrogen and carbon monoxide may be introduced concurrently, but the preferred procedure is to introduce them in countercurrent fashion with the coolant flowing downward by gravity over the catalyst. At no point in the reaction chamber should the liquid coolant establish a liquid level.

If the reaction pressure is such that at reaction temperature the liquid coolant is above its boiling point, excessive vaporization or flashing of the coolant at the point of entry would take place, thus tending to cool the reactor at this point and predominantly vaporizing the liquid coolant before it had a chance to drain down the catalyst bed. If, on the other hand, the reaction pressure is such that at reaction temperature the liquid coolant is appreciably below its boiling point, the exothermic heat of reaction tends to increase the temperature of the coolant to some point intermediate between the boiling temperature and reaction temperature. Therefore, under these conditions, the reaction temperature would not be constant throughout the reaction zone.

In the Fischer-Tropsch reaction, when catalysts known to the prior art, such as cobalt-thoria-kieselguhr, nickel-thoria, or iron catalysts are used, it is necessary, as the catalyst deteriorates, to increase the reaction temperature over a period of time in order to maintain the conversion level and, consequently, the production level constant. In accordance with the present invention, the reaction pressure is increased to correspond to increases in reaction temperature in order to maintain the cooling fluid under substantially boiling conditions. With cobalt and iron catalysts, the temperature increase during their useful life may be of the order of 50–90° F.

As cooling liquids, fractions of the Fischer-Tropsch product may be used. A fraction, for example, boiling in the range 295–305° F. has been found particularly useful and may be operated in the reaction pressure range of 30–40 p. s. i. g. at a reaction temperature of 392° F. with a cobalt-thoria catalyst. Extraneous liquid hydrocarbons may also be used provided they are substantially sulfur-free, non-aromatic, and, preferably, saturated. Water is a preferred cooling medium since it is more easily separated from the Fischer-Tropsch product. Operating pressures will be in the neighborhood of 290–310 p. s. i. g. when water is used as the cooling medium. Furthermore, the latent heat of vaporization of water per gram is much greater than that of hydrocarbons, so that a much smaller quantity of water is required to maintain the temperature constant. In general, the coolants selected are liquids which are inert in the reaction.

In general, for hydrocarbon coolants, the ratio of coolant to product formed will be between 40 and 100, whereas in the case of water as a coolant, ratios as low as 15 may be used.

In the case of catalyst chambers whose diameter is much less than the length of the chamber, multipoint injection of the cooling fluid may be necessary. According to the present invention, the diameter of the catalyst chamber for efficient cooling is not limited.

In the present invention, catalysts known to the prior art may be used such as cobalt-thoria, iron, nickel-thoria. Reaction temperatures will depend upon the catalyst employed. For cobalt-thoria type catalysts, the temperature range is approximately 180–220° C. For nickel-thoria type catalysts, the temperature range is approximately 170–200° C., and for iron catalysts, 220–280° C. Space velocities normally employed for cobalt-thoria and nickel-thoria catalysts will be in the neighborhood of 100 volumes of synthesis gas (NTP) per volume of catalyst per hour. For iron catalysts, space velocities may be as high as 150 or even 300. Reaction pressures may vary from atmospheric to 500 p. s. i. g. In general, for cobalt- and nickel-type catalysts, the synthesis gas will consist of two parts of hydrogen to one of carbon monoxide. Frequently, with iron catalysts, the synthesis gas is composed of one to two parts hydrogen to one part of carbon monoxide by volume.

The following examples illustrate the mode of operation of this invention:

*Example I*

A series of runs were made in a 3″ I. D. steel reaction tube. The catalyst used consisted of 100 parts cobalt metal, 18 parts of thorium dioxide and 100 parts of diatomaceous earth. The reaction tube was surrounded by a water jacket maintained at the desired reaction temperature. The space velocity of reaction gases, consisting of two parts hydrogen and one part carbon monoxide by volume, was 100 volumes per volume of catalyst per hour. Approximately 3 liters of catalyst was charged to the reactor. The liquid coolant was charged to the top of the reactor and the flow of gas was countercurrent. A hydrocarbon alkylate with a boiling range of 295–305° F. at 760 mm. pressure was used as liquid coolant. This alkylate was a fraction obtained from the alkylate produced by isobutane-ethylene alkylation in the presence of aluminum chloride. In the following table, the conversions, rates of flow of liquid coolant, and maximum temperature spread throughout the catalyst bed are given.

| Pressure, p. s. i. | Temperature Spread, °F. | Coolant Rate, cc./hr. | Conversion, Percent CO | Reaction Temp. Desired, °F. | Percent of Reacted CO Converted to $C_3+$ |
|---|---|---|---|---|---|
| [1] 50 | 6 | 1,000 | 90 | 410 | 50 |
| 80 | 40 | 1,200 | 90 | 410 | 35 |
| 90 | 110 | 2,160 | 90 | 410 | 25 |

[1] The liquid coolant boils at 410° F. under a pressure of approximately 50 p. s. i.

The above results clearly indicate the increased cooling efficiency obtained by proper coordination of temperature and pressure with boiling point of coolant. At 50 p. s. i. and 410° F., the temperature spread is only 6° while the extent of conversion of CO to $C_3+$ is 50%. At higher pressures, the volume of coolant is much greater and greater temperature spreads and much lower yields are obtained.

*Example II*

Under the same conditions of space velocity and temperature as in Example I, water was used as the cooling agent. The reaction temperature was 410° F., and the reaction pressure was maintained at approximately 280 p. s. i. The maximum temperature spread throughout the reactor was 5° F. when 600 cc. of water per hour was charged to the reactor. The percentage of reacted carbon monoxide converted to $C_3+$ was approximately 50 per cent.

*Example III*

Under conditions similar to those described in Example I, various coolants were utilized while allowing the temperature to increase to compensate for deterioration of catalyst over a period of time, so as to maintain constant conversion of CO. At the same time, the pressure was also gradually increased in order to maintain conditions at approximately the boiling point of the coolant. The conditions of operation are shown in the following table:

| Catalyst | Approximate Reaction Temperature Range | Coolant | Approximate Pressure Range, p. s. i. (gauge) |
|---|---|---|---|
| Cobalt | °C. 180–220 | Water | 125–325 |
|  |  | Normal Heptane | 125–190 |
| Nickel | 170–200 | Fischer-Tropsch product (B. P. 295–305° F.). | 0–10 |
|  |  | Normal decane | 0–15 |
| Iron | 220–280 | Water | 340–440 |
|  |  | Normal Heptane | 185–440 |

Under the conditions described, the desired reaction temperatures and yields were substantially maintained with constant volumes of coolant.

I claim:

1. In a process for the synthesis of hydrocarbons by the catalytic conversion of carbon monoxide-hydrogen mixtures, the improvement which comprises contacting said mixtures in a synthesis reaction zone with an iron catalyst at a temperature within the range of 220 to 280° C. and at a pressure within the range of 185 to 440 pounds per square inch gauge, maintaining a body of liquid coolant in said synthesis reaction zone, introducing said coolant to said reaction zone at the boiling point of said coolant and at the synthesis reaction temperature within the range of 220 to 280° C., countercurrently to the flow of said gaseous mixtures with coolant flowing downwardly by gravity over said iron catalyst without establishing a liquid level in said reaction zone, and regulating the pressure in said reaction zone within the range of 185 to 440 pounds per square inch gauge so as to maintain said coolant at its boiling point.

2. A process according to claim 1 wherein the coolant is water and the pressure is within the range of 340 to 440 pounds per square inch gauge.

3. A process according to claim 1 wherein the coolant is normal heptane.

ALFRED CLARK.

REFERENCES CITED

The following references are of record in the file of this patent:

UNITED STATES PATENTS

| Number | Name | Date |
|---|---|---|
| 2,238,766 | Alberts | Apr. 15, 1941 |
| 2,244,196 | Herbert | June 3, 1941 |
| 2,406,851 | Redcay | Sept. 3, 1946 |
| 2,448,279 | Rubin | Aug. 31, 1948 |

FOREIGN PATENTS

| Number | Country | Date |
|---|---|---|
| 469,618 | Great Britain | July 29, 1937 |
| 474,191 | Great Britain | Oct. 27, 1937 |